United States Patent
Schulte

(10) Patent No.: US 10,706,516 B2
(45) Date of Patent: Jul. 7, 2020

(54) IMAGE PROCESSING USING HISTOGRAMS

(71) Applicant: FLIR Systems, Inc., Wilsonville, OR (US)

(72) Inventor: Stefan Schulte, Marke (BE)

(73) Assignee: FLIR Systems, Inc., Wilsonville, OR (US)

( * ) Notice: Subject to any disclaimer, the term of this patent is extended or adjusted under 35 U.S.C. 154(b) by 189 days.

(21) Appl. No.: 15/706,369

(22) Filed: Sep. 15, 2017

(65) Prior Publication Data

US 2018/0082410 A1 Mar. 22, 2018

Related U.S. Application Data

(60) Provisional application No. 62/396,062, filed on Sep. 16, 2016.

(51) Int. Cl.
*G06F 16/583* (2019.01)
*G06T 5/40* (2006.01)
(Continued)

(52) U.S. Cl.
CPC .............. *G06T 5/40* (2013.01); *G06F 16/583* (2019.01); *G06K 9/3241* (2013.01);
(Continued)

(58) Field of Classification Search
CPC ... G06T 5/40; G06T 7/75; G06T 2207/20081; G06T 2207/30232; G06T 2207/10016;
(Continued)

(56) References Cited

U.S. PATENT DOCUMENTS 5,546,475 A * 8/1996 Bolle ................... G06K 9/4647
382/190
5,883,973 A * 3/1999 Pascovici ........... H04N 1/40062
382/112

(Continued)

FOREIGN PATENT DOCUMENTS

JP 2002203246 7/2002
WO WO 2015/020422 12/2015

OTHER PUBLICATIONS

Rubner et al., The Earth Mover's Distance as a Metric for Image Retrieval, Computer Science Department, Stanford Universited, https://www.cs.duke.edu/~tomasi/papers/rubner/rubnerTr98.pdf, 20 pages.

*Primary Examiner* — Sheela C Chawan
(74) *Attorney, Agent, or Firm* — Haynes and Boone, LLP

(57) ABSTRACT

A system and method for comparing and searching for digital data, such as images, using histograms includes receiving a source image, receiving a comparison image, generating a first histogram for the source image and generating a second histogram for the comparison image. The source image may be received from a network device, such as a computer or camera, and the comparison image may one of a plurality of stored images in a database. The histograms may correspond to an image characteristic, including a color histogram corresponding to the distribution of the intensity of a corresponding color among image pixels in the source image. Each of first and second histograms is normalized and a similarity score is calculated between the two histograms. The similarity score represents a similarity measure between the two histograms, calculated from a subset of bins, which are independently selected for each image.

20 Claims, 9 Drawing Sheets

(51) Int. Cl.
  *G06K 9/32* (2006.01)
  *G06K 9/46* (2006.01)
  *G06K 9/62* (2006.01)
  *G06T 7/73* (2017.01)

(52) U.S. Cl.
  CPC ......... *G06K 9/4642* (2013.01); *G06K 9/6212* (2013.01); *G06T 7/75* (2017.01); *G06T 2207/10016* (2013.01); *G06T 2207/20081* (2013.01); *G06T 2207/30232* (2013.01)

(58) Field of Classification Search
  CPC .. G06F 16/583; G06K 9/3241; G06K 9/4642; G06K 9/6212
  USPC ....... 382/170, 275, 131, 293, 274, 100, 276, 382/254, 128, 168; 348/36, 143, 207.99, 348/335; 600/173, 425, 111
  See application file for complete search history.

(56) References Cited

U.S. PATENT DOCUMENTS

| | | | |
|---|---|---|---|
| 6,088,658 A | 7/2000 | Yazici et al. | |
| 6,351,556 B1* | 2/2002 | Loui | G06K 9/4647 382/164 |
| 6,721,449 B1 | 4/2004 | Krishnamachari | |
| 6,865,295 B2 | 3/2005 | Trajkovic | |
| 6,993,452 B2 | 1/2006 | Huang et al. | |
| 7,386,170 B2 | 6/2008 | Ronk et al. | |
| 7,454,078 B2* | 11/2008 | Ramamurthy | H04N 5/235 348/E5.034 |
| 7,715,623 B2 | 5/2010 | Ling et al. | |
| 8,121,379 B2 | 2/2012 | Chefd'hotel et al. | |
| 8,472,714 B2* | 6/2013 | Brogren | G06K 9/00369 382/100 |
| 8,837,829 B2* | 9/2014 | Shimizu | G09G 3/3406 345/690 |
| 8,897,553 B2 | 11/2014 | Lee | |
| 10,341,053 B2* | 7/2019 | Ahirwar | |
| 2002/0069032 A1 | 6/2002 | Huang et al. | |
| 2007/0110306 A1 | 5/2007 | Ling et al. | |
| 2012/0246189 A1 | 9/2012 | Castellanos et al. | |
| 2013/0083999 A1* | 4/2013 | Bhardwaj | G06Q 30/0643 382/165 |
| 2015/0310309 A1* | 10/2015 | Gopalan | G06F 16/51 382/199 |
| 2018/0109354 A1* | 4/2018 | Ahirwar | H03M 13/1102 |

* cited by examiner

IMAGE PROCESSING USING HISTOGRAMS

CROSS-REFERENCE TO RELATED APPLICATIONS

This application claims the benefit of and priority to U.S. Provisional Patent Application No. 62/396,062 filed Sep. 16, 2016 and entitled "IMAGE PROCESSING USING HISTOGRAMS," which is incorporated herein by reference in its entirety.

TECHNICAL FIELD

The present application relates generally to imaging systems and, more particularly, to systems and methods for processing digital images in an image retrieval system.

BACKGROUND

The proliferation of digital data has led to an increased need for efficient comparison of datasets, such as digital images. An image retrieval system, for example, may include an image query process that compares a source image to images stored in an image database to find matching or similar images. Comparing images on a pixel-by-pixel basis is computationally expensive and impractical for many applications where fast search results are expected.

To increase the speed and accuracy of search results, concept and content based search methods are employed. In concept-based searching, images are stored with corresponding tags, keywords, text-based descriptions, classifications, or other data that identifies the image. The image data is indexed and searched to identify corresponding images that match certain concept criteria. In content-based searching, each image is analyzed to identify image properties that may be summarized and used in a search. Known approaches for comparing images include color and pattern matching, shape identification, quantization and the creation of image summaries that capture relevant image information to be used in a search.

A common approach for summarizing an image is through a histogram representing the distribution of certain image properties. Images are stored and indexed with corresponding histograms and during an image search, the histogram of a source image is constructed and compared to stored histograms to determine whether corresponding stored images are similar.

Various approaches for constructing and comparing histograms are known in the art. In one approach, described in U.S. Pat. No. 6,721,449, a Gaussian pyramid is used to approximate a continuous diffusion process across all pyramid layers of a histogram, and the difference between two histograms is measured as a diffusion distance. U.S. Pat. No. 6,865,295 describes a palette-based histogram matching system that uses vector generation as a way of searching within a set of image features. In U.S. Pat. No. 8,897,553, images are compared using color histograms, including determining a comparison metric based on the difference between bin values. U.S. Pat. No. 7,386,170 discloses an approach that includes defining desired features of an image, which includes a color histogram, and then searching for similarity within a database. In U.S. Pat. No. 8,121,379, Earth Mover's Distance is used to determine the similarity between two histograms. Other approaches for measuring the similarity of histograms include determining the cost to transform one histogram into a second histogram, and comparing histograms using Chi Square tests.

However, there is a continued need for improved systems and methods for matching digital data in an electronic system, including improved systems and methods for image matching through histograms.

SUMMARY

Systems and methods are disclosed in accordance with one or more embodiments for comparing and searching for digital data using histograms.

An exemplary method for comparing two images includes receiving a source image, receiving a comparison image, generating a first histogram for the source image and generating a second histogram for the comparison image. In one embodiment, the source image is received from a network device and the comparison image is one of a plurality of stored images (e.g., a database of images). The second histogram may be generated at the time of the comparison or generated ahead of time and stored in a database for retrieval with the comparison image. The first and second histograms may correspond to any image characteristic, including a color histogram corresponding to the distribution of the intensity of a corresponding color among image pixels in the source image.

Each of first and second histograms is normalized and a similarity score is calculated between the two histograms. The similarity score represents a similarity measure between the two histograms. In one embodiment, the similarity score is calculated from a subset of bins, separately selected for each image. The bin selection may include selecting a subset of bins having the largest values where a predetermined number of the largest bins is selected or by selecting the largest bins until a cumulative threshold is exceeded.

An exemplary image retrieval system includes an image server and an image storage system. The image server includes indexing logic and image retrieval logic for calculating and comparing histograms to identify similar images. The image storage system stores images and image data including histograms corresponding to a stored image. In one embodiment, the image server includes a program memory and a processor. The program memory stores the indexing and retrieval logic, which includes instructions for storing, indexing and retrieving images. The processor executes the stored program instructions and is configured to receive an image for storing in the image storage system, store the image, calculate a histogram representing a distribution of image characteristics, normalize the histogram and store the normalized histogram in the image storage system for retrieval with the corresponding image.

The processor may be further configured to conduct a query for an image in the image storage system, including receiving a source image, determining a histogram representing a distribution of image characteristics, normalizing the histogram, and for each of the candidate images stored in the image retrieval system, calculating a similarity measure by comparing the normalized histogram of the source image with the normalized histogram of the stored image. In one embodiment, the processor is configured to select a subset of bins from each histogram, the subset of bins representing the largest bin values in each histogram and calculate the similarity measure by comparing the subset of bins (for example, a subset comprising the n largest bins in each histogram where n is a predetermined number of bins, or a subset comprising adding the largest available bin until the cumulative value of the selected bins exceeds a threshold value). In one embodiment, the similarity measure includes an overlap calculation representing matching bin pairs found in the selected subsets of bins. In another embodiment, the similarity measure is equivalent to two times the sum of the min value of each pair divided by the total value of the subsets.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
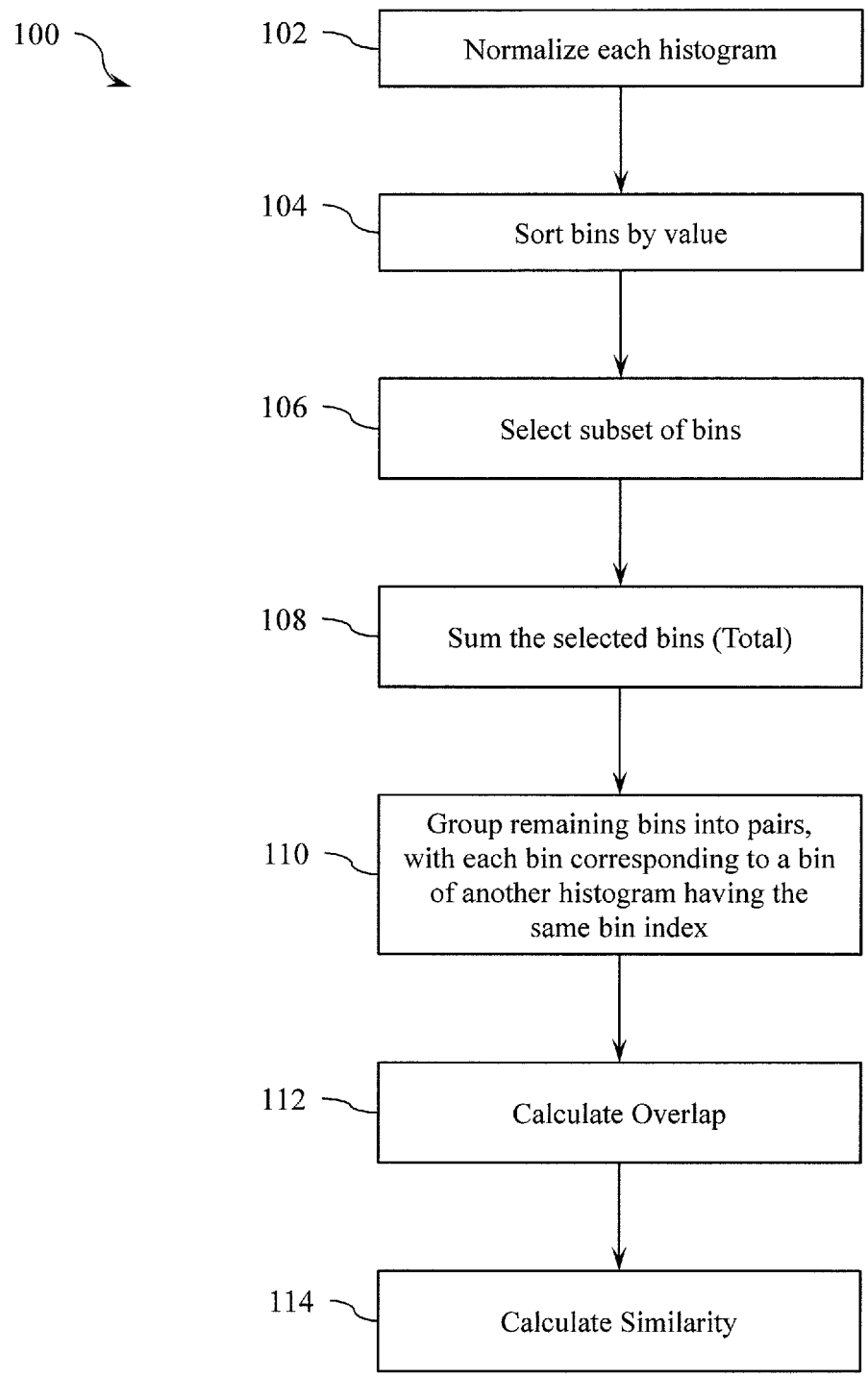
FIG. 1 is an embodiment of an exemplary process for comparing two histograms.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In accordance with various embodiment of the present disclosure, systems and methods for comparing digital data using histograms are provided.

Figure 2A:
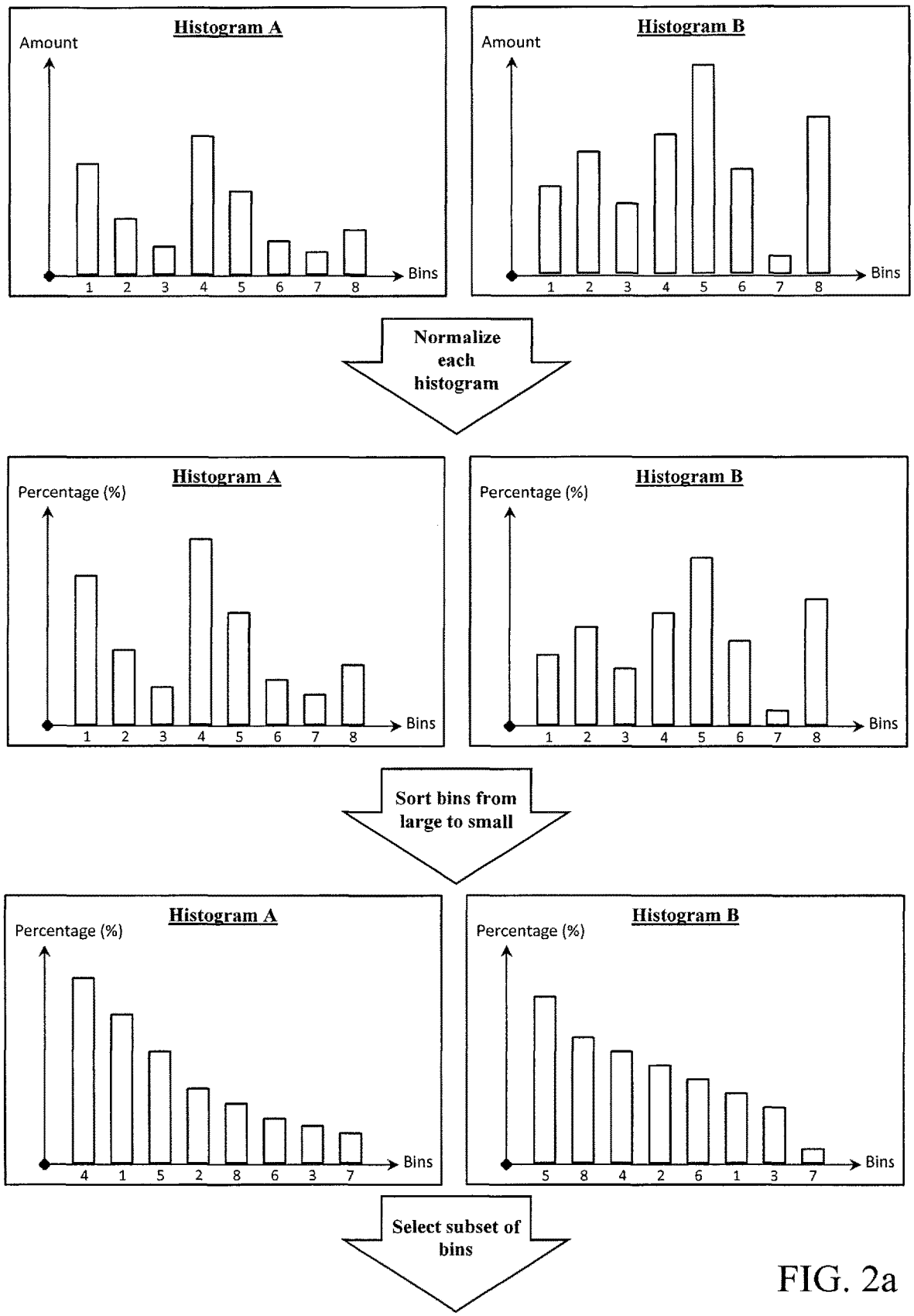
FIGS. 2a and 2b illustrate an embodiment of an exemplary process for comparing two histograms.
Figure 2B:
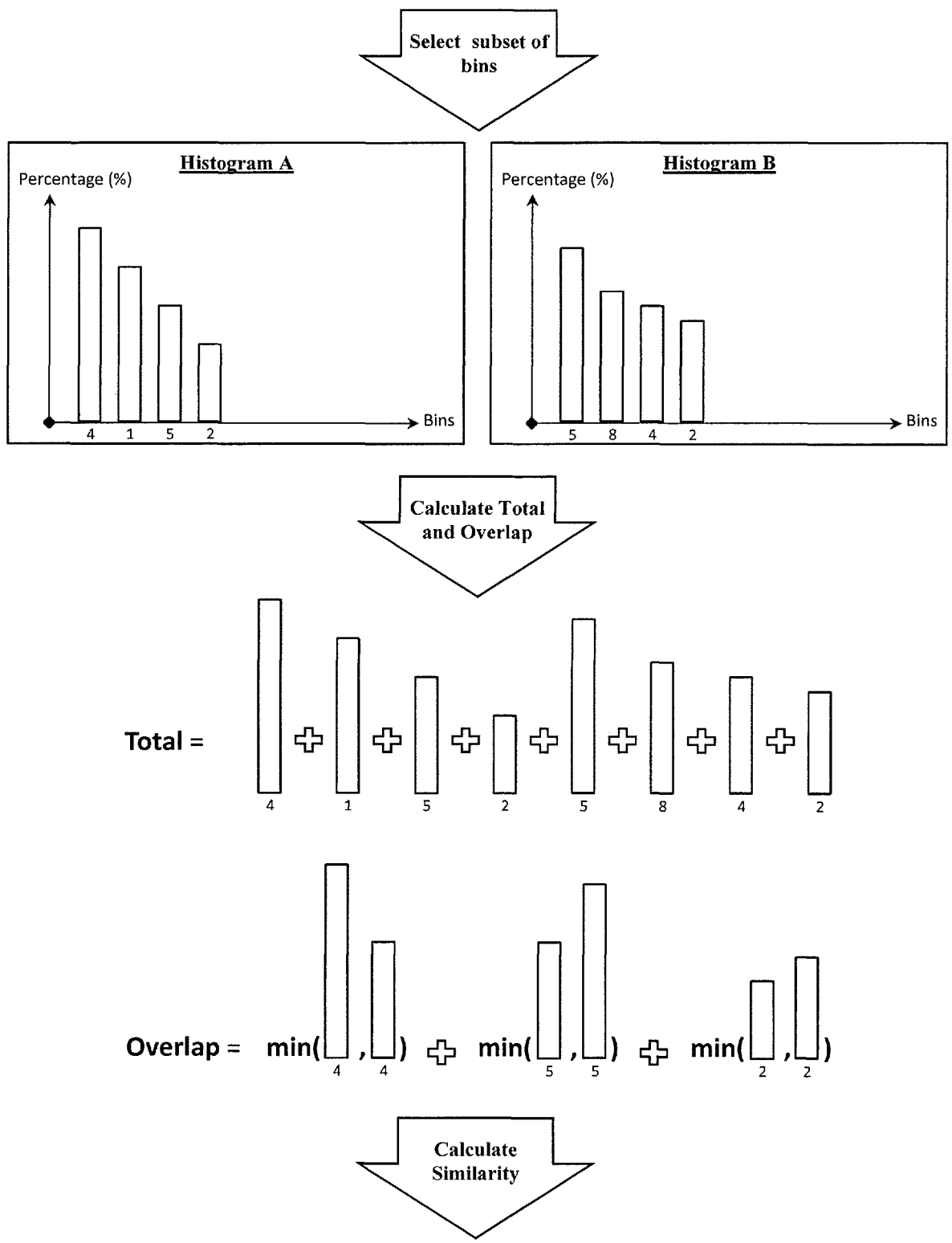

Referring to FIGS. 1, 2a and 2b, an exemplary process 100 for comparing two histograms (Histogram A [Ha] and Histogram B [Hb]) is described. In one embodiment, each histogram is a color histogram representing the color distribution for a given image, and the histogram comparison determines the degree to which the two images are similar. It will appreciated that various embodiments may include histograms representing other image attributes or the use of the histograms to summarize and compare other datasets.

In step 102, the histograms are normalized. In the exemplary embodiment, each bin value is converted to a percentage of the sum of all bins in the corresponding histogram, such that the sum of all bins in each normalized histogram is 1 or 100%. In step 104, the bins of each normalized histogram are then sorted from the largest to the smallest. In step 106, a subset of bins is selected from each histogram, representing the largest bins in the respective histogram. In one embodiment, a predetermined number of the largest bins are selected, for example the 4 largest bins out of 8. In another embodiment, the largest bins are incrementally selected until a cumulative sum of the bins exceeds a predetermined threshold.

The values of the selected bins of the two histograms are combined and summed in step 108 to produce a TOTAL value. Next, a histogram OVERLAP value is calculated. First, in step 110, the selected bins are grouped into pairs by corresponding bin index value (Idx). In the exemplary embodiment, bins without a corresponding pair are ignored in this step. The OVERLAP value is calculated in step 112 as the sum of the min (Ha(Idx), Hb(Idx)) for all Idx that are part of a pair. A histogram SIMILARITY measure is calculated in step 114 using the OVERLAP and TOTAL values. In the exemplary embodiment, the SIMILARITY is calculated as 2*Overlap/Total. This similarity measure will be a measure between 0 and 1, with 0 indicating that the two histograms Ha and Hb are not similar, and 1 indicating that the two histograms are similar. Values between 0 and 1 correspond to a degree of similarity. In alternative embodiments, other scoring ranges may be used.

Figure 3:
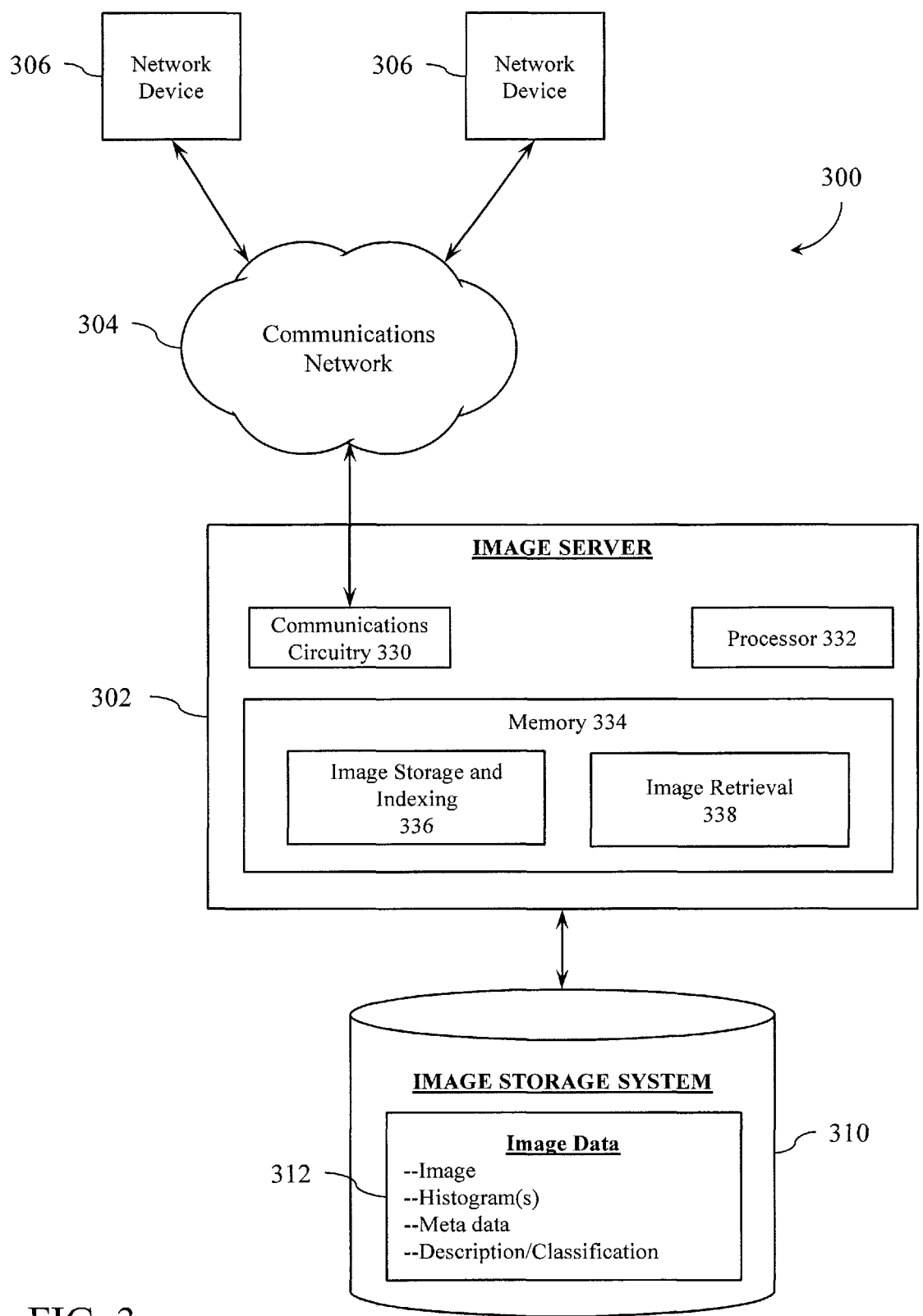
FIG. 3 is an embodiment of an exemplary image retrieval system for implementing the histogram similarity measure of FIGS. 1, 2a, and 2b.

An exemplary image retrieval system implementing the histogram similarity measure of FIGS. 1, 2a and 2b is illustrated in FIG. 3. The image retrieval system 300 includes an image server 302 connected to one or more network devices 306 over a communications network 304. The image server 302 is configured to store images and image-related data, and process image retrieval requests received from one or more network devices 306. The communications network 304 may include one or more local networks such as a wireless local area network (WLAN), wide area networks such as the Internet, and other wired or wireless communications paths suitable for facilitating communications between components as described herein.

The image server 302 may be implemented on one or more servers such as an application server that performs data processing and/or other software execution operations for storing and retrieving images. In various embodiments, the image server 302 may operate as a general purpose image storage system, such as a cloud-based image storage system or world wide web image search engine, or may be configured to operate in a dedicated system, such as a video surveillance system that stores video and images captured in real time from a plurality of image capture devices.

The image server 302 system includes communications circuitry 330 for facilitating communications with network device 306 over communications network 304, one or more processors 332 (e.g., logic devices, microcontrollers, processors, application specific integrated circuits (ASICs), field programmable gate arrays (FPGAs) or other devices) used by the image server 302 to execute appropriate instructions, such as program instructions stored in memory 334, including Image Storage and Index logic 336 and Image Retrieval logic 338.

The memory 334 may be implemented in one or more memory devices (e.g., memory components) that store executable instructions, data and information, including image data, video data, audio data, network information. The memory devices may include various types of memory for information storage including volatile and non-volatile memory devices, such as RAM (Random Access Memory), ROM (Read-Only Memory), EEPROM (Electrically-Erasable Read-Only Memory), flash memory, a disk drive, and other types of memory described herein.

An image storage system 310 stores image related data 312 accessed by the image retrieval server 302. The image storage and indexing logic 336 includes executable instructions for causing the processor 332 to receive image data for storage in the image storage system 310, process corresponding image related data and store the image and image related data in the image storage system 310. In various embodiments, the image server 302 is configured to receive image data from a network device 306, including the image itself, create one or more histograms summarizing image characteristics, and store the image and associated image data and histogram information in the image storage system 310. In various embodiments, the image storage system 310 may be implemented as database accessing a data storage system and may include hard disk drive(s), network attached storage, storage area network(s), redundant array of independent disks (RAID) and other data storage systems and devices known in the art.

Each network device 306 may be implemented as a computing device such as a desktop computer or network server, a mobile computing device such as a mobile phone, tablet, laptop computer or other computing device having communications circuitry (e.g., wireless communications circuitry or wired communications circuitry) for connecting with other devices in system 300.

The communications circuitry 330 may include circuitry for communicating with other devices using various communications protocols. In various embodiments, communications circuitry 330 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies. Communications circuitry 330 may be further configured to interface with a wired network and/or device via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communications circuitry 330.

Communications circuitry 330 may also be configured for a wireless communication protocol and interface based on radio frequency (RF), microwave frequency (MWF), infrared frequency (IRF), and/or other appropriate wireless transmission technologies. Communications circuitry 330 may include one or more antennas for wireless communication purposes. Thus, in one example, communications circuitry 330 may handle, manage, or otherwise facilitate wireless communication by establishing wireless communication links to a wireless router, hub, or other appropriate wireless devices.

Figure 4:
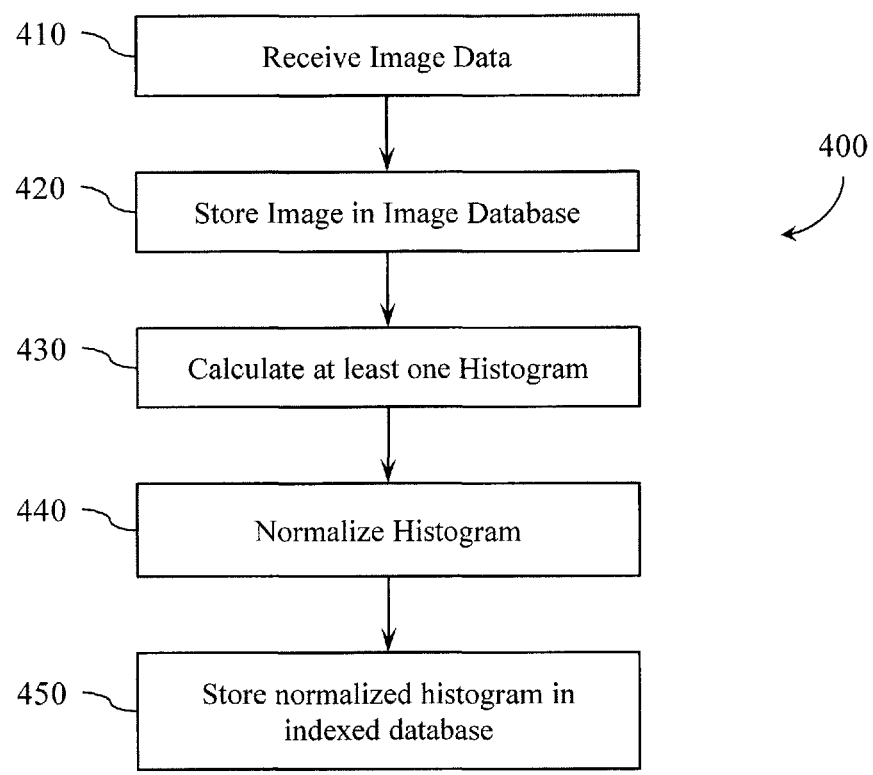
FIG. 4 is an embodiment of an exemplary operation of image storage and indexing logic.

Referring to FIG. 4, an exemplary operation of image storage and indexing logic 336 will now be described. The program logic 400 may be used to populate the image storage system 310 with image and histogram data. In step 410, the imaging server receives image data for storage in the image storage system 310. The image data includes a digital image, and may include additional image data such as keywords, context and classification information, image attributes, and an image title. In various embodiments, the image data may be received from a network device over the communications network, through a local storage device connected to the image server or through a batch process from another database. In step 420, the received image data is stored in image storage system 310.

In step 430, at least one histogram is created to summarize attributes of the image. In one embodiment, color histograms are generated from the digital image, with each histogram representing the distribution of each color component in the image color space. For example, three separate color histograms (red, green, blue) could be created for an RGB image, with each histogram representing the distribution of the respective color intensity among pixels in the image. The color histogram may be stored in an indexed database. In step 440, each histogram is normalized to a common scale of 100% and stored in the indexed database in step 450. In alternative embodiments, steps 430 to 450 can be performed on images in an existing image database to generate indexed histogram data to facilitate image retrieval.

Figure 5:
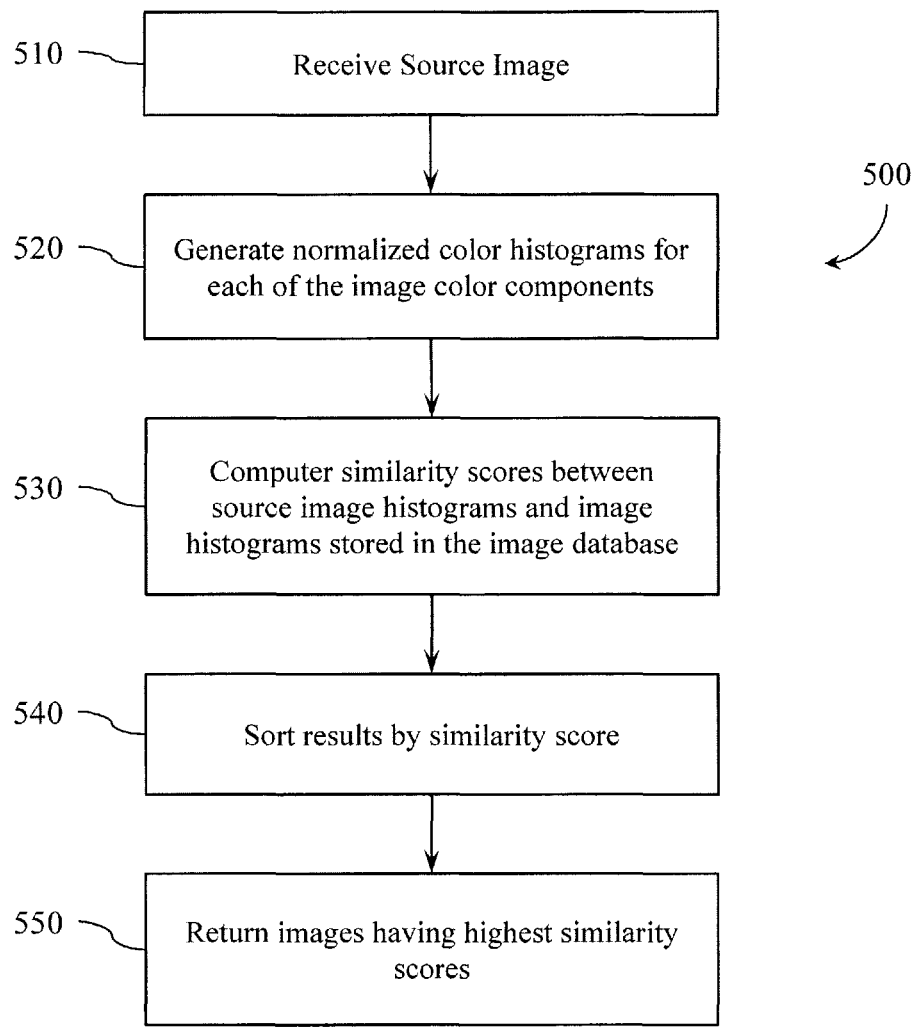
FIG. 5 is an embodiment of an exemplary operation of image retrieval logic.

Referring to FIG. 5, an exemplary operation of image retrieval logic 338 will now be described. In step 510, the image server 302 receives a source image as a query. In step 520, normalized color histograms are generated for each of the image color components. Next, in step 530 similarity scores are calculated between each of the source image histograms and the image histograms stored in the image storage system. The three similarity scores corresponding to each stored image are combined (e.g., averaged) resulting in a similarity score for the image. The similarity scores are sorted in step 540 to identify the images that are most similar to the source image. In step 550 the images having the highest similarity scores are returned to the requesting device.

In various embodiments, the histogram similarity methods described herein may be combined with other image retrieval approaches, including histograms of other image attributes, such as intensity, edge detection, shape detection, and objection detection, histograms calculated for sub-regions of an image, context-based data and other image data. The histogram similarity methods may also be used with a variety of image storage and retrieval systems, such as an image search on a web application or a video surveillance and retrieval system.

Figure 6:
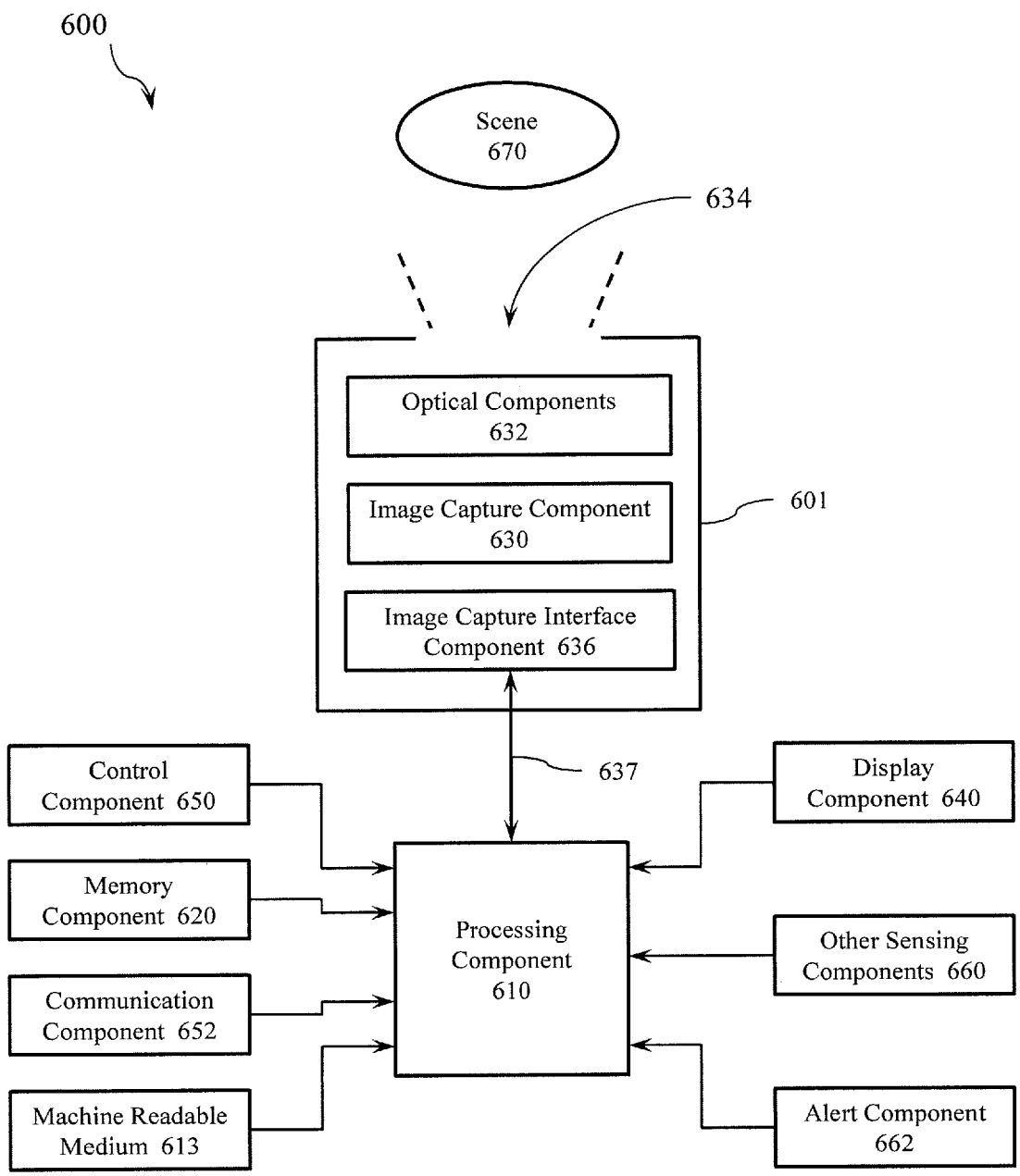
FIG. 6 is an embodiment of an imaging system an in exemplary video surveillance system.

An embodiment of an image storage and retrieval system for use in a video surveillance system is illustrated in FIG. 6. Imaging system 600 may be used to capture and process image frames in accordance with various techniques described herein. In one embodiment, various components of imaging system 600 may be provided in a camera component 601, such as an imaging camera. In another embodiment, one or more components of imaging system 600 may be implemented remotely from each other in a distributed fashion (e.g., networked or otherwise).

In the illustrated embodiment, imaging system 600 includes a processing component 610, a memory component 620, an image capture component 630, optical components 632 (e.g., one or more lenses configured to receive electromagnetic radiation through an aperture 634 in camera component 601 and pass the electromagnetic radiation to image capture component 630), an image capture interface component 636, a display component 640, a control component 650, a communication component 652, other sensing components 660, and an alert component 662.

In various embodiments, imaging system 600 may be implemented as an imaging device, such as camera component 601, to capture image frames, for example, of a scene 670 in the field of view of camera component 601. In some embodiments, camera component 601 may include image capture component 630, optical components 632, and image capture interface component 636 housed in a protective enclosure. Imaging system 600 may represent any type of camera system including, for example, devices that detect electromagnetic radiation (e.g., irradiance) and provides representative data (e.g., one or more still image frames or video image frames). For example, imaging system 600 may represent a camera component 601 that is directed to detect visible light and/or infrared radiation and provide associated image data.

Imaging system 600 may include a portable device and may be implemented, for example, as a handheld device and/or coupled, in other examples, to various types of vehicles (e.g., a land-based vehicle, a watercraft, an aircraft, a spacecraft, or other vehicle). Imaging system 600 may be implemented with camera component 601 at various types of fixed locations (e.g., train station platform, metro platform, car parking lot, or other locations) via one or more types of structural mounts. In some embodiments, camera component 601 may be mounted in a stationary arrangement to capture repetitive images of a target scene 670.

Processing component 610 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein. Processing component 610 is adapted to interface and communicate with components 620, 630, 640, 650, 660, and 662 to perform method and processing steps as described herein. In various embodiments, it should be appreciated that processing operations and/or instructions may be integrated in software and/or hardware as part of processing component 610, or code (e.g., software or configuration data) which may be stored in memory component 620. Embodiments of processing operations and/or instructions disclosed herein may be stored by a machine readable medium 613 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 613 may be included as part of imaging system 600 and/or separate from imaging system 600, with stored instructions provided to imaging system 600 by coupling the machine readable medium 613 to imaging system 600 and/or by imaging system 600 downloading (e.g., via a wired or wireless link) the instructions from the machine readable medium (e.g., containing the non-transitory information). In various embodiments, as described herein, instructions provide for real time applications of processing various image frames of scene 670.

Memory component 620 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 610 is adapted to execute software stored in memory component 620 and/or machine-readable medium 613 to perform various methods, processes, and operations in a manner as described herein.

Image capture component 630 includes, in one embodiment, one or more sensors (e.g., any type visible light, infrared, or other type of detector) for capturing image signals representative of an image, of scene 670. In one embodiment, the sensors of image capture component 630 provide for representing (e.g., converting) a captured thermal image signal of scene 670 as digital data (e.g., via an analog-to-digital converter included as part of the sensor or separate from the sensor as part of imaging system 600).

Processing component 610 may be adapted to receive image signals from image capture component 630, process image signals (e.g., to provide processed image data), store image signals or image data in memory component 620, and/or retrieve stored image signals from memory component 620. In various aspects, processing component 610 may be remotely positioned, and processing component 610 may be adapted to remotely receive image signals from image capture component 630 via wired or wireless communication with image capture interface component 636, as described herein. Processing component 610 may be adapted to process image signals stored in memory component 620 to provide image data (e.g., captured and/or processed image data) to display component 640 for viewing by a user.

Display component 640 includes, in one embodiment, an image display device (e.g., a liquid crystal display (LCD)) or various other types of generally known video displays or monitors. Processing component 610 may be adapted to display image data and information on display component 640. Processing component 610 may be adapted to retrieve image data and information from memory component 620 and display any retrieved image data and information on display component 640. Display component 640 may include display electronics, which may be utilized by processing component 610 to display image data and information. Display component 640 may receive image data and information directly from image capture component 630 via processing component 610, or the image data and information may be transferred from memory component 620 via processing component 610.

Control component 650 includes, in one embodiment, a user input and/or interface device having one or more user actuated components, such as one or more push buttons, slide bars, rotatable knobs or a keyboard, that are adapted to generate one or more user actuated input control signals. Control component 650 may be adapted to be integrated as part of display component 640 to operate as both a user input device and a display device, such as, for example, a touch screen device adapted to receive input signals from a user touching different parts of the display screen. Processing component 610 may be adapted to sense control input signals from control component 650 and respond to any sensed control input signals received therefrom.

Control component 650 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, it should be appreciated that the control panel unit may be adapted to include one or more other user-activated mechanisms to provide various other control operations of imaging system 600, such as auto-focus, menu enable and selection, field of view (FoV), brightness, contrast, gain, offset, spatial, temporal, and/or various other features and/or parameters.

In another embodiment, control component 650 may include a graphical user interface (GUI), which may be integrated as part of display component 640 (e.g., a user actuated touch screen), having one or more images of the user-activated mechanisms (e.g., buttons, knobs, sliders, or others), which are adapted to interface with a user and receive user input control signals via the display component

640. As an example for one or more embodiments as discussed further herein, display component 640 and control component 650 may represent appropriate portions of a tablet, a laptop computer, a desktop computer, or other type of device.

Processing component 610 may be adapted to communicate with image capture interface component 636 (e.g., by receiving data and information from image capture component 630). Image capture interface component 636 may be configured to receive image signals (e.g., image frames) from image capture component 630 and communicate image signals to processing component 610 directly or through one or more wired or wireless communication components (e.g., represented by connection 637) in the manner of communication component 652 further described herein. Camera 601 and processing component 610 may be positioned proximate to or remote from each other in various embodiments.

In another embodiment, imaging system 600 may include one or more other types of sensing components 660, including environmental and/or operational sensors, depending on the sensed application or implementation, which provide information to processing component 610 (e.g., by receiving sensor information from each sensing component 660). In various embodiments, other sensing components 660 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 660 may include one or more conventional sensors as would be known by those skilled in the art for monitoring various conditions (e.g., environmental conditions) that may have an effect (e.g., on the image appearance) on the data provided by image capture component 630.

In some embodiments, other sensing components 660 may include devices that relay information to processing component 610 via wireless communication. For example, each sensing component 660 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

Imaging system 600 may include an alert component 662 adapted to interface with processing component 610 (e.g., via wired or wireless communication) and provide a notification in response to input received from processing component 610. Notification may be communicated in various formats. For example, in one embodiment, an audible signal (e.g., audible alarm) may provide notification to a user and/or persons within range of the audible signal. In another embodiment, a visible signal (e.g., flashing light) may provide notification to a user and/or persons within sight of the visible signal. An electronic message (e.g., electronic message received by a smart phone, a tablet, a personal digital assistant (e.g., a wireless, mobile device), a laptop computer, a desktop computer, or other type of device) may be communicated in response to an input received from processing component 610.

In one embodiment, communication component 652 may be implemented as a network interface component (NIC) adapted for communication with a network including other devices in the network. In various embodiments, communication component 652 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 652 may include an antenna coupled thereto for wireless communication purposes. In other embodiments, the communication component 652 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, imaging system 600 and/or its individual associated components may be associated with a particular network link such as for example a URL (Uniform Resource Locator), an IP (Internet Protocol) address, and/or a mobile phone number.

In various embodiments, imaging system 600 provides a capability, in substantially real time, to detect an object in target scene 670. For example, imaging system 600 may be configured to capture two or more images of target scene 670 using camera 601 (e.g., a thermal imaging camera). Captured images may be received by processing component 610 and stored in memory component 620. Processing component may be configured to define a trajectory between two locations within target scene 670. Processing component 610 may extract from each of the captured images, a subset of pixel values of target scene 670 corresponding to trajectory 605. Processing component 610 may process the extracted pixel values to detect an object in target scene 670 by comparing two or more image frames of extracted subsets of pixel values and determining changes in the subsets of pixel values among the two or more images. In addition, processing component 610 may determine a location and a direction of travel of the detected object.

A video surveillance system may include numerous image capture devices 600 that continuously image various fields of view in real time. Efficient and reliable detection of an object of interest within a field of view of an imaging device is a desired feature in many applications, including detection of objects in real-time. However, image analysis can be process intensive and the amount of image data to be analyzed can be voluminous.

In one approach, an object may be detected by comparing known stationary background images against images received from an image capture device. In various embodiments, the background image may be single image, a composite image or a model of the background that accounts for changing conditions such as lighting, shadows and weather. The image processing system may include one or more background modeling algorithms for receiving background images and developing a model of the background for use in object detection. The background model is compared to images received from the image capture device to detect objects that appear in the foreground of a scene based on an analysis of the differences between images. If an object is detected, the image may be further analyzed to identify and classify the detected object.

Figure 7:
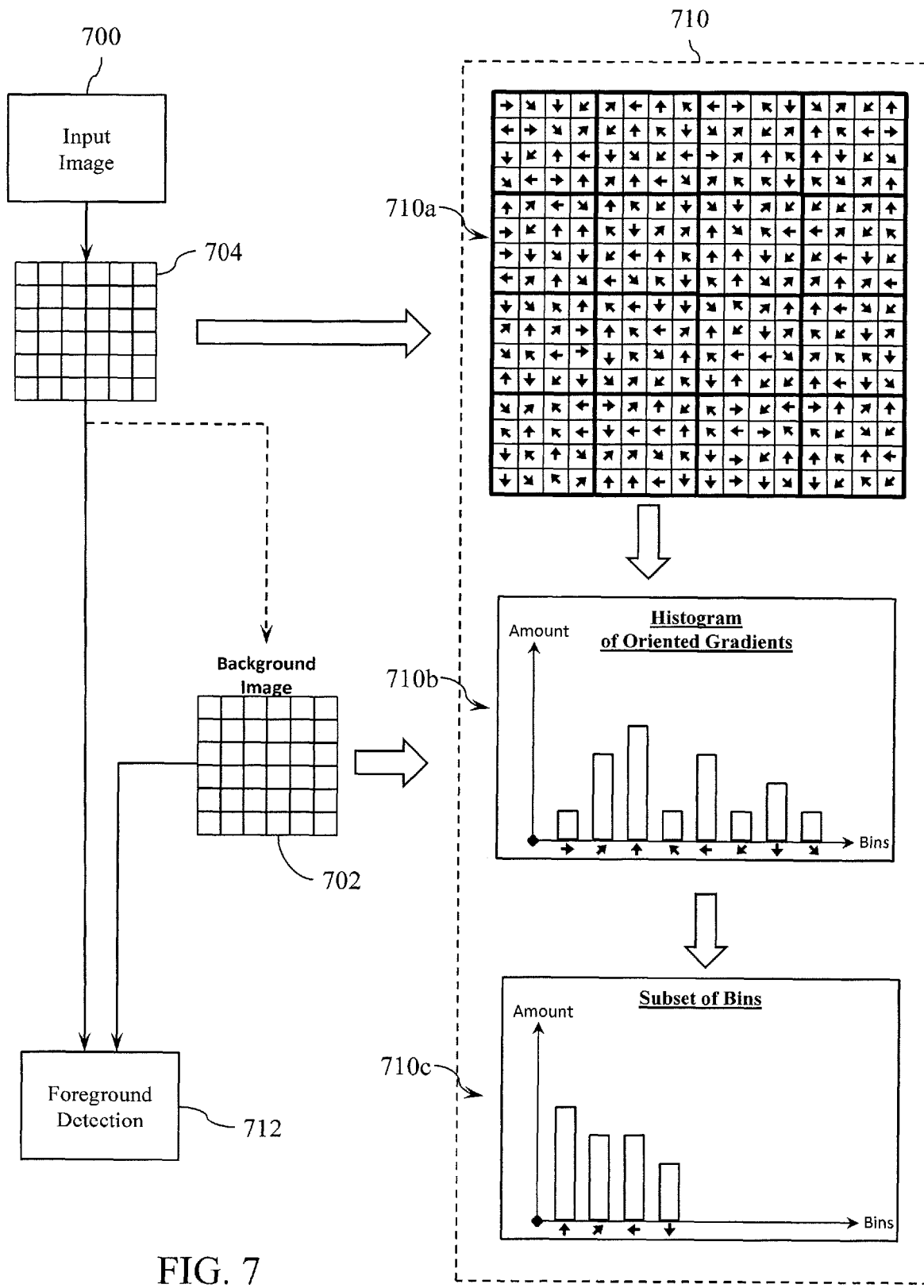
FIG. 7 is an embodiment of image storage and retrieval in an exemplary video surveillance system.

Referring to FIG. 7, an embodiment of an efficient foreground detection algorithm will now be described. An image capture device captures a stream of images 700 of a target scene. A fixed image of the target scene may be captured at various times for use in creating a background image model 702, which may be compared to subsequent images received from the image capture device to identify differences between the images that represent one or more foreground objects in the field of view.

To facilitate real-time comparison of the input images to the background image 702, each input image 700 is subdivided into blocks of pixels 704. Image attributes for each block are calculated and a separate histogram is constructed for the image attributes of each block. In one embodiment, each image is divided into a plurality of cells of pixels (e.g., 4×4, 8×8, and 10×10 pixels), which are further grouped into blocks of cells (e.g., 4×4 blocks). For example, oriented gradients may be calculated for each cell, and each block will have a corresponding histogram representing a count of each cell gradient orientation in the block. In alternate embodiments, other cell and block sizes and geometries may be used, including overlapping cells and blocks, and other image attributes may be calculates such as color or intensity.

In operation, an input image 700 is received, divided into blocks, and image attributes for each block are calculated to produce a corresponding histogram for each block (704). Each block's histogram is normalized, the bins are sorted and the n largest bins are selected (e.g., 4 largest bins), where n is a subset of the total number of bins in each histogram (710c). In an alternate embodiment, the largest bins are selected until the total exceeds a threshold value (e.g., 70%). The modeled background image 702 is similarly processed (710) including calculating oriented gradients for each cell (710a), producing a corresponding histograms of oriented gradients for each block (710b) and selecting a subset of bins (710c) representing the background image 702 for use in image comparison.

Next, a similarity score is calculated between the histograms 710c for each block of the input image 704 and the corresponding histograms 710c for each block of the background image. In one embodiment, a similarity score is calculated as 2 times the OVERLAP divided by the TOTAL, where OVERLAP is the sum of the minimum value of each corresponding bin pair, and the TOTAL is the sum of each bin value in the image and background histograms 710c. The similarity score may then be used to identify objects, motion or further processing of the image or storage of an image sequence if a lack of similarity is detected.

In one embodiment, the similarity score is used for foreground detection 712, which may include background subtraction to detect a foreground object and isolate portions of the image for further processing, such as motion tracking or image classification. For example, a threshold can be used to determine whether a block of the received image is background or a foreground object based on the similarity score. If the similarity score is above the threshold, then the block is classified as background. If the similarity score is at or below the threshold, then the block is classified as foreground. The foreground blocks represent a potential object in the field of view and may be used for further image processing, such as object classification or motion detection, or to trigger actions by the video surveillance system. In various embodiments, a video surveillance system may use object and motion detection to trigger the video surveillance system to record the image stream from the image capture device, to classify the objects and activity within the field of view, or perform other analyses and actions in accordance with the system configuration.

Figure 8A:
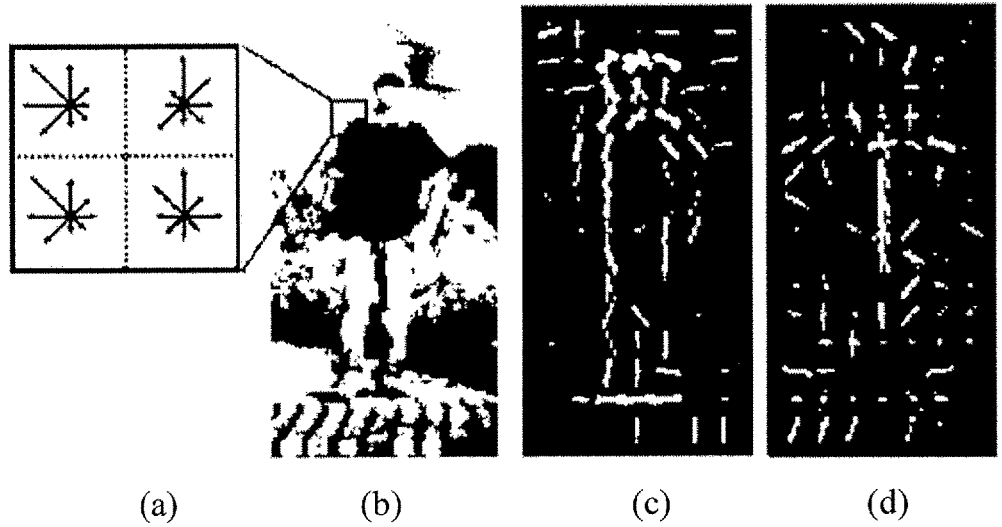
FIGS. 8a and 8b illustrate an embodiment of image storage and retrieval in an exemplary video surveillance system.
Figure 8B:
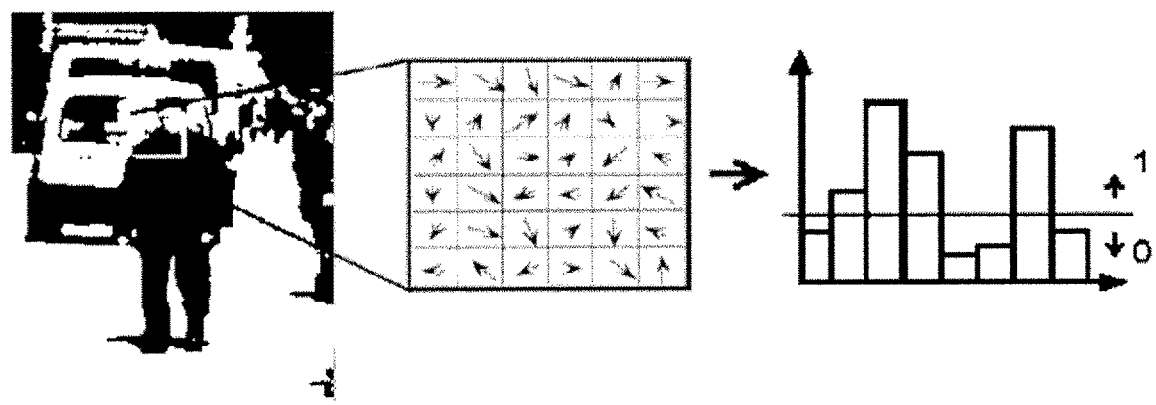

FIGS. 8a and 8b illustrate an object classification system which may be used with the histogram comparison methods described herein. In one embodiment, an object classification system includes a learning model (e.g., support vector machine) that analyzes a series of training images 810 using oriented gradient histograms (a) for each block of the training image (b). The learning model extracts the features vector for images containing the desired object (c) (e.g., a human, animal, vehicle or other object), and may also extract the features vector for negative images that do not contain the desired object (d). The images may be classified by the histogram distribution of each block and the arrangement of blocks into the desired object (e.g., a human image). The stored images and histograms may then be used for image classification as described herein.

In one embodiment, the stored object classification histograms are stored as described in FIG. 7 (see 710c) for use in comparison to an input image 820 or object detected in an input image. The input image 820 is represented as a plurality of blocks, each block having an associated histogram of image attributes, such as oriented gradients. The image blocks are then compared to the image blocks of objects in the classification database using the histogram comparison methods described herein to determine the best fit with known objects.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for comparing two images comprising:
   receiving a source image;
   receiving a comparison image;
   generating a first histogram for the source image;
   generating a second histogram for the comparison image;
   separately normalizing each of the first and second histograms to produce a normalized first histogram and a normalized second histogram; and
   calculating a similarity score between the first normalized histogram and the second normalized histogram, the similarity score representative of a similarity measure between the first normalized histogram and the second normalized histogram.

2. The method of claim 1, wherein generating a first histogram for the source image comprises:
   generating a color histogram corresponding to the color distribution of the image pixels.

3. The method of claim 2, wherein generating a first histogram for the source image further comprises:
generating a color histogram for each color component of the image, each color histogram representing the distribution of the intensity of the corresponding color among image pixels.

4. The method of claim 3, wherein each of the color histograms is normalized.

5. The method of 1, wherein calculating the similarity score further comprises calculating a similarity score from a subset of bins.

6. The method of claim 5, wherein the subset of bins is selected from the bins having the largest values.

7. The method of claim 6, wherein a predetermined number of the largest bins are selected.

8. The method of claim 6, wherein the largest bins are selected until a cumulative threshold is exceeded.

9. The method of claim 5 wherein calculating the similarity score further comprises calculating a total value of the subset of bins from each histogram and performing an overlap calculation representing matching bins pairs found in the selected subsets of bins.

10. The method of claim 1, wherein the source image is received from a video camera and the comparison image is a stored background image; and
wherein the similarity score is compared to a threshold value to detect whether a foreground object is present in the source image.

11. The method of claim 1, wherein the source image is a detected foreground object and the comparison image represents a known object from an object classification system; and
wherein the similarity score is further representative of a similarity between the detected foreground object and the known object.

12. An image retrieval system configured to perform the method of claim 1, the image retrieval system comprising:
an image server comprising image storage and indexing logic and image retrieval logic; and
an image storage system storing image data including color histograms corresponding to stored images.

13. A system comprising:
an image storage system configured to store image data including stored images and corresponding histograms;
a program memory storing program instructions; and
a processor configured to execute the program instructions;
to conduct a query for an image stored in the image storage system, wherein the processor is further configured to:
receive a source image;
determine a histogram for the source image representing a distribution of image characteristics;
normalize the histogram; and
calculate a similarity measure by comparing the normalized histogram of the source image with a normalized histogram corresponding to the one or more stored images.

14. The system of claim 13, wherein the
program memory is further configured to store instructions for storing, indexing, and retrieving images; and
wherein the processor is further configured to:
receive an image for storing in the image storage system;
store the image in the image storage system;
calculate a histogram representing a distribution of image characteristics;
normalize the histogram;
store the normalized histogram in the image storage system and associated with the corresponding image.

15. The system of claim 13, wherein the processor is further configured to:
select a subset of bins from each histogram, the subset of bins representing the largest bin values in each histogram;
wherein the similarity measure is determined by comparing the subset of bins.

16. The system of claim 15, wherein the processor is further configured to:
select the n largest bins, where n is a predetermine number of bins.

17. The system of claim 15, wherein the processor is further configured to select the largest bin until the cumulative value of the selected bins exceeds a threshold value.

18. The system of claim 15, wherein the similarity measure includes a total value of the selected bins.

19. The system of claim 15, wherein the similarity measure includes an overlap calculation representing matching bins pairs found in the selected subsets of bins.

20. The system of claim 15, wherein the similarity measure is equivalent to 2 times the sum of the min value of each pair divided by the total value of the subsets.

* * * * *